(12) United States Patent
Han et al.

(10) Patent No.: US 6,297,850 B1
(45) Date of Patent: Oct. 2, 2001

(54) SYNC SIGNAL GENERATING APPARATUS AND METHOD FOR A VIDEO SIGNAL PROCESSOR

(75) Inventors: Dongil Han; Heung Chul Oh, both of Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/222,930

(22) Filed: Dec. 30, 1998

(30) Foreign Application Priority Data

Dec. 31, 1997 (KR) ................................................ 97-80718

(51) Int. Cl.[7] ..................................................... H04N 5/06
(52) U.S. Cl. ........................... 348/521; 348/554; 348/555; 348/542
(58) Field of Search .................................... 348/553, 554, 348/555, 558, 542, 543, 567, 536, 537; H04N 3/27, 5/46

(56) References Cited

U.S. PATENT DOCUMENTS

| | | | |
|---|---|---|---|
| 4,679,091 | * 7/1987 | Kikuchi et al. | 348/543 |
| 4,962,427 | * 10/1990 | Lunn et al. | 348/555 |
| 5,627,598 | * 5/1997 | Tsuchida | 348/567 |
| 5,926,228 | * 7/1999 | Jeon et al. | 348/554 |
| 6,057,889 | * 5/2000 | Reitmeier et al. | 348/555 |
| 6,067,123 | * 5/2000 | Lee | 348/555 |
| 6,091,458 | * 7/2000 | Jeon et al. | 348/554 |

* cited by examiner

Primary Examiner—Reinhard J. Eisenzopf
Assistant Examiner—Trang U. Tran

(57) ABSTRACT

A sync signal generating apparatus and method for video signal processor are disclosed comprising an image processor processing either an input digital television video signal or an input analog television video signal to display one of the signals; a display unit displaying an output signal of the image processor; a frame rate detector detecting a frame of the digital video signal and generating a frame rate signal; a display mode detector detecting whether an image to be currently displayed is a digital television image or an analog television image and generating a display mode signal; a clock generator generating a clock signal according to the display mode signal and the format signal to the image processor; a sync signal compensation unit generating a sync compensation signal based upon the display mode signal, the clock signal, and a vsync signal of the analog television video signal; and a sync signal generator resetting and compensating a sync signal based upon the sync compensation signal and the clock signal and sending the compensated sync signal to the image processor.

20 Claims, 6 Drawing Sheets

SYNC SIGNAL GENERATING APPARATUS AND METHOD FOR A VIDEO SIGNAL PROCESSOR

BACKGROUND OF THE INVENTION

1. Field of the Invention

The present invention relates to a video signal processor and more particularly to a sync signal generating apparatus for a video signal processor.

2. Background of Related Art

In the United States of America, digital broadcast has been implemented on August of 1998 along with the conventional analog broadcast and a complete replacement of the analog broadcast with the digital broadcasts has been planned for the year 2006. Although, the digital broadcast has not been implemented in Europe or in Asia, the British Empire and Sweden plan to introduce digital broadcasts in the latter half of next year and a full conversion into digital broadcasts is planned for the year 2012 in all European countries. Korea plans to commence digital broadcast testing and fully convert into digital broadcasts by 2010. Finally, Japan plans to start digital broadcasts in 2000 and complete digitalization of broadcasts by 2010.

Accordingly, a television for receiving digital broadcast signals has not been fully developed. Thus, a television receiver capable of processing both the digital broadcast signal and the conventional National Television System Committee (NTSC) signal is required until the digital broadcasts fully replaces the conventional analog signal.

An NTSC image has a fixed frame rate of 59.94 Hz and uses a clock signal of 74.175 MHz. In contrast, the digital image has variable frame rates and uses a clock signal of 74.25 MHz for frame rates of 60 Hz, 30 Hz, and 24 Hz while a clock signal of 74.175 MHz is used for frame rates of 59.94 Hz, 29.97 Hz, and 23.98 Hz. By selecting the correct clock signal corresponding to the frame rate of the input data, a television receiver can appropriately operate.

Thus, the clock signal must be properly selected in order to process both the digital television image and the NTSC image. Namely, the clock for image processing should be synchronized with 59.94 Hz when the receiver displays the NTSC images while a proper clock signal should be selected according to the frame rate of input data when the receiver displays digital television images.

Although a synchronous (sync) signal for a frame rate of the transmitted NTSC image and a sync signal of the digital image processor may both be 59.94 Hz signal, the signals may not be synchronized due differences in the frequencies of the clock used. Thus, to process a NTSC image, the image processor of the digital image receiver uses a clock of 74.175 MHz corresponding to a NTSC sync signal for the frame rate of 59.94 Hz. Accordingly, difference between the synchronous signal of a NTSC image and the sync signal of the image processor is reduced.

Nonetheless, even if a clock of 74.175 MHz is utilized, the clock signals of the NTSC input image and the clock signals of the digital image processor may never be synchronized. Moreover, if the signals were synchronized, the signals may at some point become unsynchronized.

Particularly, between the two sync signals of the NTSC and the digital image, one sync signal may be ahead or be delayed relative to the other sync signal. This occurs during the transmitting and receiving of data when the data is transmitted in a wrong format. As a result, the image processor may display an incorrectly processed image obtained, for example, from a de-interlacing of wrong data.

Figure 1:
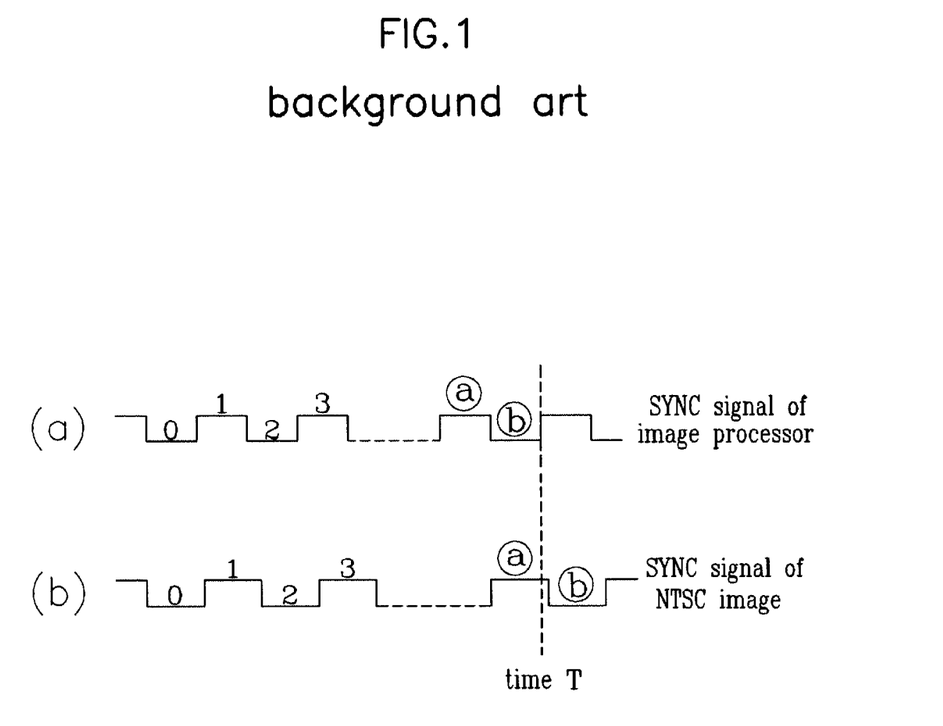

FIGS. 1A and 1B show a case where a field sync signal of a NTSC image for timely reading and writing the NTSC image is not synchronized with the sync signal of a digital image processor. Namely, the sync signal of the NTSC image is relatively delayed when compared with the sync signal of a digital image processor.

At time T, the digital image processor should already have received the NTSC image data corresponding to the field sync signal "b" as shown in FIG. 1A in order to perform deinterlacing with the image data of the previous field, stored in advance. However, the NTSC image processor has not written data corresponding to the sync signal "b." Moreover, because the signals are not synchronized, the data of the previous field is also not correctly stored. As a result, the digital image processor performs the de-interlacing with respect to wrong image data.

To overcome this problem, a locking circuit for synchronizing the sync signal of the NTSC image and the sync signal of the digital image processor is required.

SUMMARY OF THE INVENTION

Accordingly, an object of the present invention is to solve at least the problems and disadvantages of the related art.

An object of the present invention is to provide a sync signal generating apparatus which compensation utilizing a sync signal of an analog image signal to generate an appropriate sync signal in a digital image signal processor.

Another object of the present invention is to provide a sync signal generating apparatus which compensates a sync signal in a digital image signal processor when the number of NTSC horizontal sync (hsync) signals is within a predetermined range.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the present invention resets a sync signal of a receiver according to a vertical sync (vsync) signal of an analog image and generates a compensated sync signal when an image to be displayed is the analog image.

The apparatus comprises an image processor for processing either an input digital video signal or an input analog video signal to display one of the signals; a display unit for displaying an output signal of the image processor; a frame detector for detecting a format of the input digital video signal; a display mode detector for detecting whether a current image to be displayed is a digital image or an analog image; a clock generator for generating a corresponding clock signal in response to both output signals of the frame rate detector and the display mode detector; a sync signal compensation unit for generating a sync compensation signal using both outputs of the display mode detector and the clock generator and the vsync signal of the analog image; and a sync signal generator for resetting and compensating a sync signal according to the sync compensation signal and generating the compensated sync signal.

BRIEF DESCRIPTION OF THE ATTACHED DRAWINGS

The invention will be described in detail with reference to the following drawings in which like reference numerals refer to like elements wherein:

FIGS. 1(a) and (b) show waveforms of a sync signal of a NTSC image and a sync signal generated in a receiver;

DETAILED DESCRIPTION OF PREFERRED EMBODIMENT

The preferred embodiment of the present invention comprises an image processor processing either an input digital image signal or an input analog image signal to display one of the signals; a sync generator generating sync signals for the image processor; and a sync signal compensation unit outputting a control signal to compensate the sync signals according to an analog image signal if the sync signal of the analog image signal is within a predetermined range.

Particularly, the sync signal compensation unit outputs the control signal to compensate the sync signals if the number of hsync signals of the analog image signal for one vsync signal of the analog image signal is within a predetermined range. Also, the sync signal compensation unit may output the control signal to compensate the sync signals if the number of hsync signals per vsync signal is within a predetermined range for several consecutive vertical signals of the analog image signal.

The sync signal compensation according to the present invention generally comprises a first delay delaying a vsync signal of an analog image signal by one clock; a first logic unit detecting the beginning of the vertical sync signal utilizing the output of the first delay and the vsync signal of the analog image signal; a counter counting the hsync signals within each vertical sync signals of the analog image signal; a comparator determining whether the count value output from the counter is within predetermined number; a compensation discriminator outputting a compensation request signal when the output of the comparator meets a predetermined level of confidence; and a second logic unit logically combining the output from the first logic unit, the output from the compensation discriminator, and the display mode signal to output a reset signal to the sync signal generator.

The sync signal compensation unit determines whether the input analog image signal is in a normal or a trick mode, and outputs a control signal to compensate the sync signal when the input signal is in the normal mode. Reference will now be made in detail to the preferred embodiments of the present invention, examples of which are illustrated in the accompanying drawings.

Figure 2:
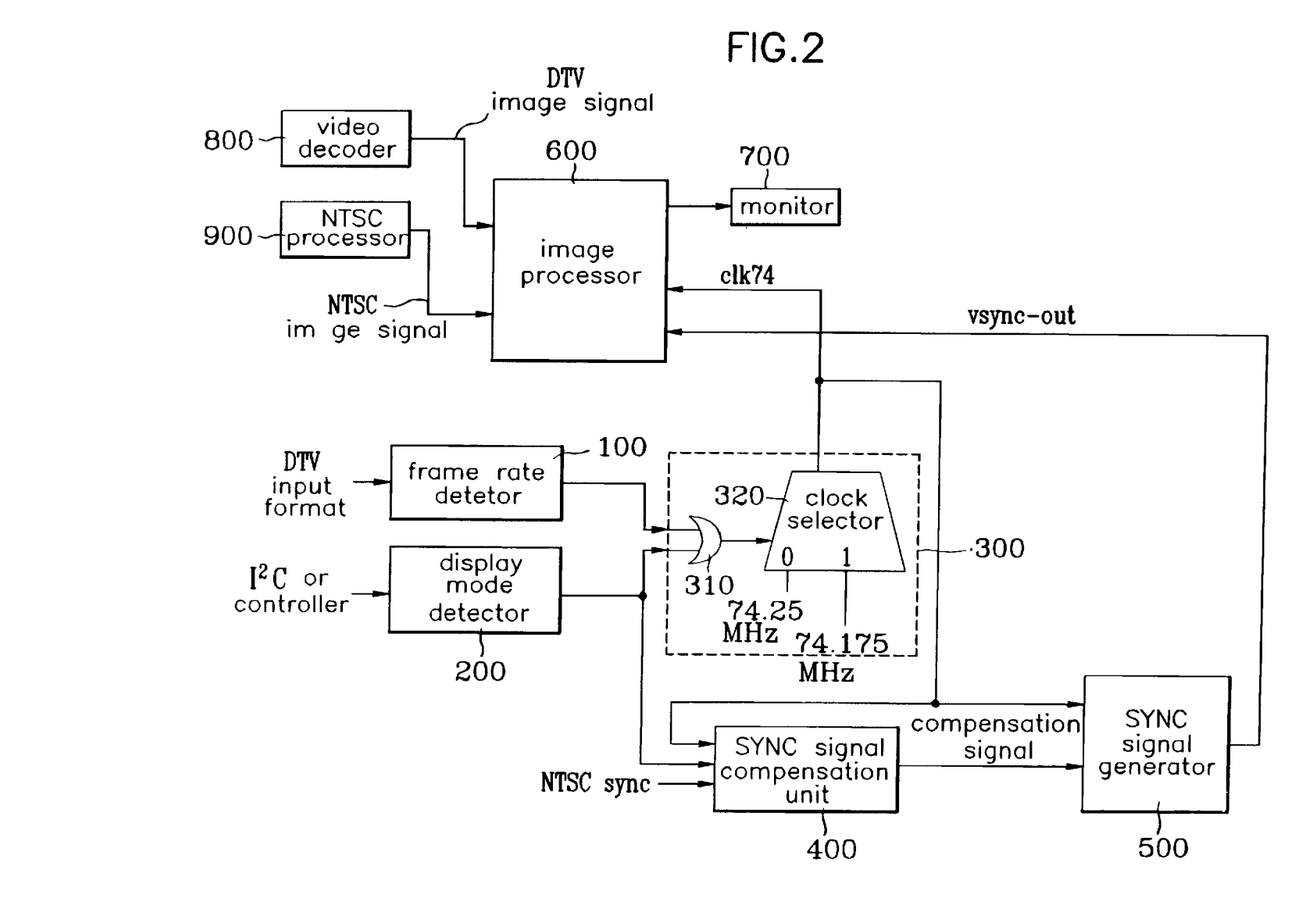
FIG. 2 is a block diagram of a digital image receiver including a sync signal generating apparatus according to the present invention.

FIG. 2 is a sync signal generating apparatus for a digital image receiver according to the present invention comprising a frame rate detector 100 detecting a frame rate of an input digital image signal; a display mode detector 200 detecting whether an image to be displayed is a digital image or an NTSC image; a clock generator 300 generating an appropriate clock signal according to the output signals of the frame rate detector 100 and the display mode detector 200; a sync signal compensation unit 400 receiving a display mode signal from the display mode detector 200, a clock signal from the clock generator, and a vertical sync signal of the NTSC image to produce a sync compensation signal; a sync signal generator 500 compensating a sync signal according to the sync compensation signal received from the sync signal compensation unit 400 and producing a compensated sync signal; an image processor 600 processing the input digital image or the NTSC image according to the clock signal from the clock signal generator 300 and the sync signal from the sync signal generator 500 to display the image; and a display unit 700 displaying the image data from the image processor.

The clock generator 300 includes an OR gate 310 performing an OR logic operation with respect to the frame rate signal from the frame rate detector 100 and the display mode signal from the display mode detector 200; and a clock selector 320 selectively outputting either a clock signal of 74.25 MHz or a clock signal of 74.175 MHz according to an output signal of the OR gate 310.

Figure 3:
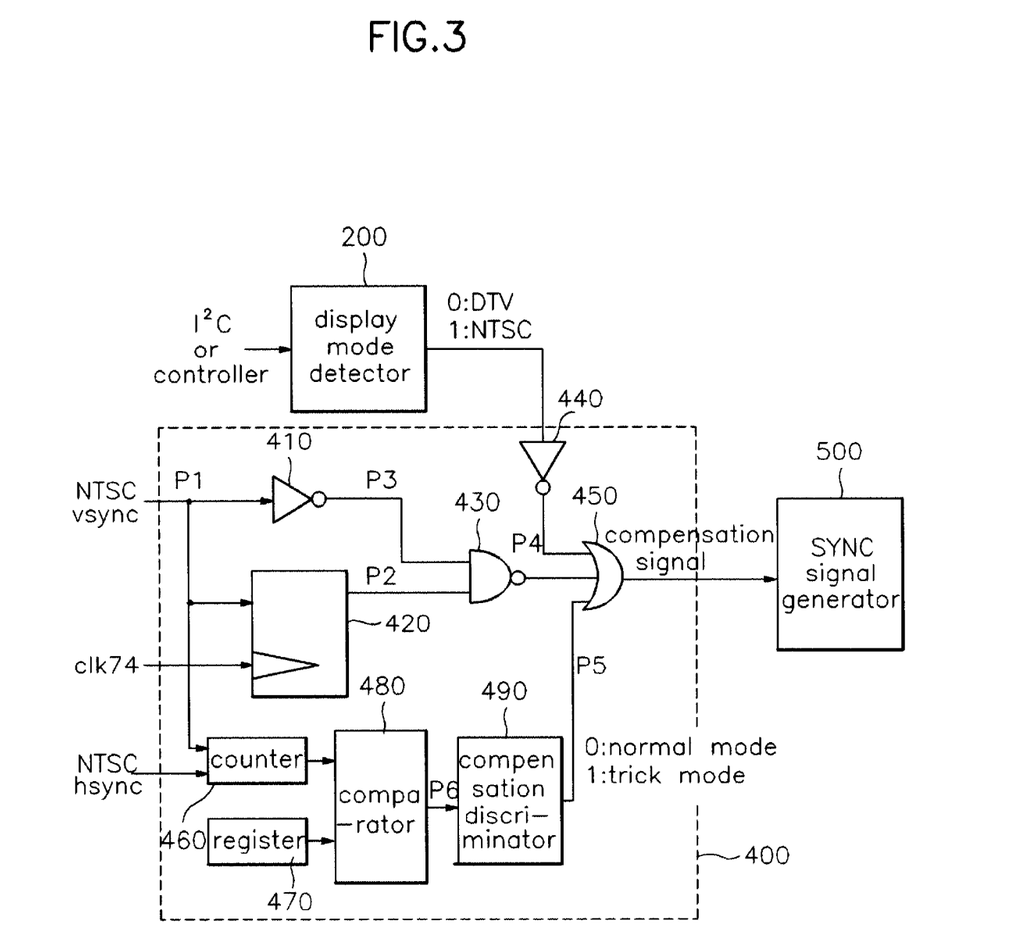
FIG. 3 is a detailed circuit diagram of a sync signal compensation unit of FIG. 2.

Also, the sync signal compensation unit 400 includes a first inverter 410 inverting a vertical sync signal of the NTSC image; a delay unit (a D-flip-flop in this embodiment) 420 delaying an output of the vertical sync signal of the NTSC image by one clock; a NAND gate 430 performing a NAND operation with respect to a signal from the first inverter 410 and a signal from the delay unit 420; a second inverter 440 inverting the signal from the display mode detector 200; a counter 460 counting the number of hsync signals within the vertical sync signal; a register 470 storing a predetermined range value; a comparator 480 comparing the counted value output from the counter and the predetermined range value; a compensation discriminator 490 determining whether the sync signal needs to be compensated utilizing the output from the comparator 480; and an OR gate 450 performing an OR logic operation with respect to the output signal of the NAND gate 430, the output signal of the second inverter 440, and the output of the compensation discriminator 490 to output a reset signal to the sync signal generator 500.

The digital image receiver further includes a video decoder 800 decoding; and a NTSC processor processing and outputting the NTSC signals. The video decoder 800 receives a compressed digital broadcast signal, recovers and forwards the it original image to the image processor 600. The video decoder 800 utilizes the horizontal and vsync signals input by the image processor 600 to decode and to recover the original image data. Upon recovery, the original image data is output back to the image processor 600. The image processor displays the digital broadcast signals, regardless whether a problem occurred in the sync signals.

The NTSC processor 900 receives the analog based NTSC signals and recovers the horizontal and vsync signals. The sync signals digitized and are output to the image processor 600 and the sync signal compensation unit 400.

The operation of the sync signal generating apparatus according to the present invention will next be discussed. If a format of the input digital image detected by the frame rate detector 100 is one of 60 Hz, 30 Hz, and 24 Hz, the frame rate detector 100 sends a logic signal "0" to the clock signal generator 300. Alternatively, if the format of the input digital image is one of 59.94 Hz, 29.97 Hz, or 29.98 Hz, the frame rate detector 100 sends a logic signal "1" to the clock generator 300.

The image processor 600 also establishes the display mode utilizing an I$^2$C bus or a remote controller. Namely, the display mode detector 200 detects the display mode and outputs the appropriate logic signal. If the detected display mode is a NTSC display, the display mode detector 200 outputs a logic signal "1" to the clock signal generator 300. Alternatively, if the detected display mode is a digital image, the display mode detector 200 outputs a logic signal "0" to the clock signal generator 300.

The OR gate 310 in the clock generator 300 performs the OR logic operation with respect to both output signals of the display mode detector 200 and the frame rate detector 100 and outputs a result of the OR operation to the clock selector 320. When the logic signal "0" is received from the OR gate 310, the clock selector 320 produces a clock of 74.25 MHz. Alternatively, when the logic signal "1" is received from the OR gate 310, the clock selector 320 produces a clock of 74.175 MHz. When a display mode is a NTSC image mode, the clock signal of 74.175 MHz is sent to the image processor 600 regardless of the format of the digital image.

Figure 4:
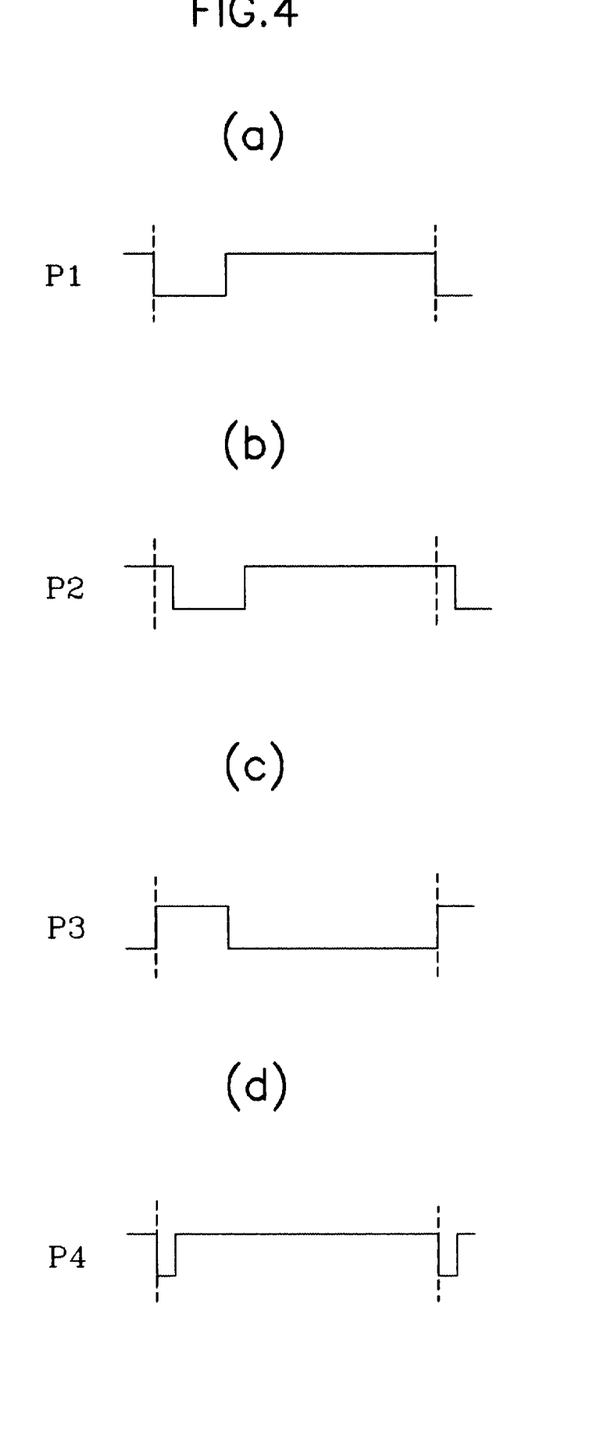
FIGS. 4(a) to (d) are output waveform signals of the circuit in FIG. 3.

Meanwhile, the first inverter 410 in the sync signal compensation unit 400 inverts the vsync signal of the NTSC image as shown in FIG. 4(a) and outputs a signal as shown in FIG. 4(c). The delay unit 420 delays the vsync signal of the NTSC image as shown in FIG. 4(a) by one clock and produces a signal as shown in FIG. 4(b).

The NAND gate 430 performs the NAND logic operation with respect to the delayed NTSC vsync signal as shown in FIG. 4(b) and the inverted NTSC vsync signal as shown in 4(c). The NAND gate 430 detects the falling edge of the NTSC vsync signal as shown in FIG. 4(d) and output the results to the OR gate 450.

A second inverter 440 inverts the display mode signal output from the display mode detector 200. The OR gate 450 performs the OR logic operation with respect to the signal as shown in FIG. 4(d), the inverted display mode signal, and the output of the compensation discriminator 490. The result of the OR gate 450 is output to the sync signal generator 500 as a reset signal.

When the display mode is the NTSC image mode, the sync signal compensation unit 400 outputs a signal as shown in FIG. 4(d) to the sync signal generator 500 as the reset signal. In response to the reset signal, the sync signal generator 500 resets a sync signal for the image processor 600 at the falling edge of the NTSC vsync signal, thereby locking the sync signal with the NTSC vsync signal. The compensated NTSC vsync signal is output to the image processor 600. Thus, the sync signal generator 500 adjusts the vertical sync signal for the image processor 600 based upon the NTSC vsync signal recovered from the NTSC processor 900.

However, even if the input image is a NTSC image, the sync signal should not always be compensated. For example, if a video cassette recorder (VCR) operates in the normal mode, the number of the hsync signals for one vertical signal is within the fixed range. When the number of the hsync signals for one vertical signal is outside the fixed range, the VCR operates in a trick mode.

For a normal mode, approximately 260–265 hsync signals must be present in either the top or bottom field of a vertical signal. If the number of hsync signals in one vertical signal is less than 260 or greater than 265, the VCR operates in a trick mode.

Particularly, an adverse result may be obtained for the normal mode if the sync signal for the image processor 600 is compensated according to the sync signal of an irregular NTSC image. For example, a portion or the whole screen may not be displayed, or if displayed, the screen may appear to vibrate. Thus, it is necessary to determine whether the NTSC image is for the normal mode or the trick mode, even if the input image is a NTSC image.

Accordingly, the counter 460 counts the number of the hsync signals for one vsync signal in order to determine whether the NTSC image is for the normal mode or the trick mode. The register 470 stores a fixed range such as a range between 260 and 265. The operation of the hsync counting will be described with reference to FIGS. 5(a) to (h).

Figure 5:
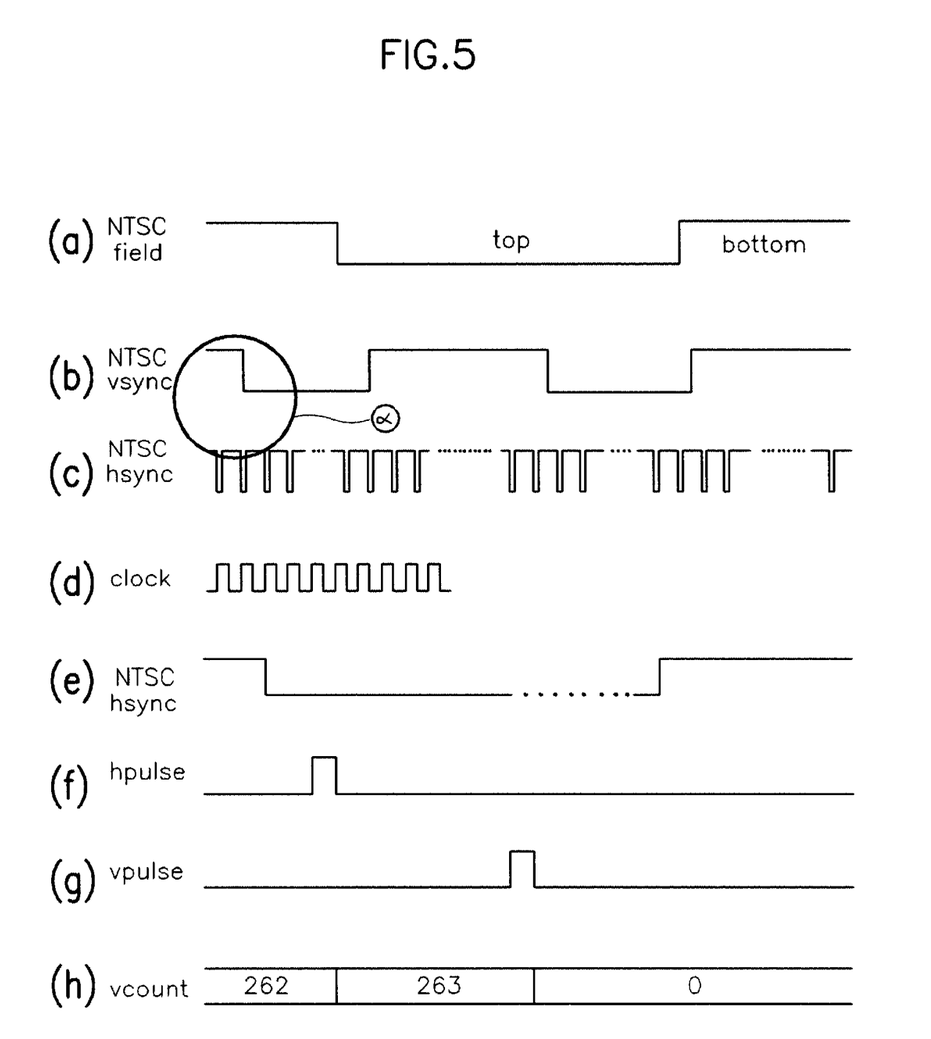
FIGS. 5(a) to (h) are waveforms illustrating the insertion of the hpulse and the vpulse for counting the number of hsync signals.

For the top and bottom NTSC field as shown in FIG. 5(a), a NTSC vsync signal and a NTSC hsync are input as shown in FIGS. 5(b) and 5(c), respectively. FIG. 5(d) is a reference clock while FIGS. 5(e) to (g) are expanded view of one falling edge of an NTSC vsync signal as indicated by a. Particularly, an hpulse as shown in FIG. 5(f) is inserted at every falling edge of the NTSC hsync signal as shown in FIG. 5(e). The count value of the counter 460 increases by one count for every hpulse. Likewise, a vpulse as shown in FIG. 5(g) is inserted at every falling edge of the NTSC vsync signal. The count value of the counter 460 continues to increase for every hpulse until a vpulse which resets the counter to 0 as shown in FIG. 5(h). Thus, the value counted by the counter 460 is the number of hsync signals for one vsync signal.

The hpulse and the vpulse may be inserted into the falling edge of the hsync and the vsync signal by combining various logic gates. Particularly, the vpulse is analogous to an inversion of the signal shown in FIG. 4(d) and would not require additional gates.

Figure 6:
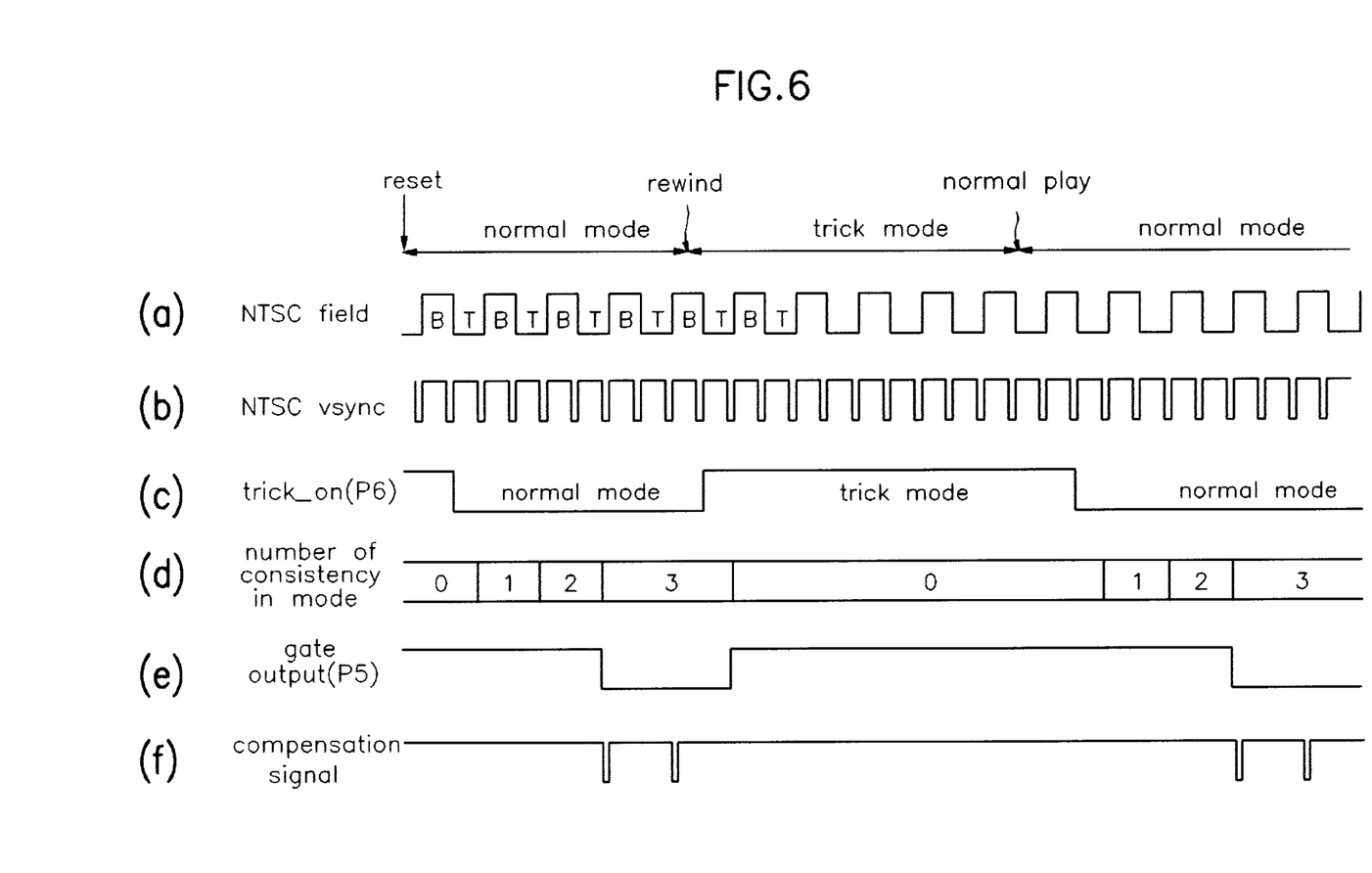
FIGS. 6(a) to (f) are waveforms showing the output signals in determining whether to compensate the sync signal.

Accordingly, the comparator 480 compares the count value from the counter 460 to the stored range of the register 470 and determines whether the count value is within the stored range of 260~265. FIGS. 6(a) to 6(f) are waveforms showing the output signals in determining whether to compensate the sync signal of the image processor 600. Specifically, FIG. 6(a) shows the top and bottom NTSC field signal and FIG. 6(b) shows the NTSC vsync signal for the field signal of FIG. 6(a).

If the count value is within 260~265, the comparator 480 determines that the NTSC signal is in the normal mode and outputs a trick_on signal of "0" as shown in FIG. 6(c). However, even if the comparator 480 determines that the NTSC signal is for the normal mode, the compensation discriminator 490 does not output a signal indicating a normal mode as shown in FIG. 6(e) unless the compensation discriminator 490 determines that the NTSC signal is for the normal mode for a predetermined number of frames as shown in FIG. 6(d). In the preferred embodiment, the predetermined number of frames has been set to three.

Even if the NTSC image is for the normal mode, depending on the system status, the number of hsync signals for one vsync signal may be outside the predetermined range of 260~265. Likewise, even if the NTSC image is for the trick mode, the number of hsync signals for one vsync signal may be within 260~265. Thus, a signal indicating a normal mode is not output unless a certain level of confidence is obtained The compensation discriminator 490 outputs to the OR gate 450 a logic signal of "0" for a normal mode and a logic signal of "1" for a trick mode. Accordingly, the OR gate 450 outputs a compensation signal as shown in FIG. 6(f) when the detected display mode is a NTSC mode and when the compensation discriminator 490 determines a normal NTSC mode. The compensation signal resets the sync signal for the image processor 600 at the falling edge of the NTSC vsync signal. Also, compensation signal is active when the detected display mode is NTSC and is in the normal mode.

Otherwise, the compensation signal is inactive for the NTSC trick mode or the DTV display mode.

When the type of image to be displayed is a DTV image or a NTSC image in the trick mode, the image processor 600 displays the image data through the display unit 700 using the appropriate clock signal from the clock generator 300. Alternatively, when the image to be displayed is the NTSC image in the normal mode, the image processor 600 displays the image data through the display unit 700 using both the clock signal from the clock generator 300 and a compensated sync signal from the sync signal generated.

The sync signal generating apparatus for the digital image receiver according to the present invention synchronizes the sync signals of two types of input images in the digital image receiver, namely the digital image and the NTSC image. Accordingly, the present invention provides appropriate clock signals and sync signals for allowing simultaneous input or output of the digital image and the NTSC image.

Specifically, when the sync signal of the NTSC image transmitted from a broadcasting station and the sync signal of the image processor in the digital image receiver are not compensated, they may not be synchronized with each other. In such case, data can be transmitted in a wrong format and the wrong data may be processed and displayed. Thus, the present invention synchronizes the sync signals of the NTSC image and the image processor in the digital image receiver, thereby allowing processing and displaying of the correct and proper image data.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A sync signal generating apparatus for a video signal processor, comprising:
   a frame detector determining the frame rate of an input digital image signal;
   a display mode detector determining whether an image to be displayed is a digital image or an analog image, and generating a display mode signal;
   a clock generator generating a clock signal according to the display mode signal and the frame rate signal;
   a sync signal compensation unit generating a sync compensation signal based upon the display mode signal, the clock signal, and an NTSC sync signal; and
   a sync signal generator compensating a sync signal according to the sync compensation signal and outputting a compensated sync signal to an image processor.

2. An apparatus of claim 1, wherein the clock generator comprises:
   an OR gate performing an OR logic operation with respect to the frame rate signal and the display mode signal; and
   a clock selector selectively outputting a clock signal corresponding to the output of the OR gate.

3. An apparatus of claim 2, wherein the clock selector outputs either a clock signal of 74.25 MHz or a clock signal of 74.175 MHz.

4. An apparatus of claim 1, wherein the sync signal compensation unit comprises:
   a first inverter inverting a vsync signal of an input analog image signal;
   a delay unit delaying an output of the vsync signal of the analog image signal by one clock;
   a NAND gate performing a NAND logic operation with respect to the outputs of the first inverter and the delay unit;
   a second inverter inverting the display mode signal; and
   an OR gate performing an OR logic operation with respect to the outputs of the NAND gate and the second inverter, said OR gate outputting a sync compensation signal.

5. An apparatus of claim 1, wherein the sync signal compensation unit comprises:
   a first inverter inverting a vsync signal of an input analog image signal;
   a delay unit delaying an output of the vsync signal of the analog image signal by one clock;
   a NAND gate performing a NAND logic operation with respect to the outputs of the first inverter and the delay unit;
   a second inverter inverting the display mode signal;
   a sync compensation determination unit determining whether an input analog image signal is in the normal mode or in the trick mode, and outputting a analog mode signal; and
   an OR gate performing an OR logic operation with respect to the outputs of the NAND gate, the second inverter, and the sync compensation determination unit, said OR gate outputting a sync compensation signal.

6. An apparatus of claim 5, wherein the sync compensation determination unit comprises:
   a counter counting the number of hsync signals in a vsync signal of the input analog image signal and outputting a count value;
   a comparator comparing the count value to a predetermined range corresponding to the normal mode of the input analog image signal and outputting a comparison result; and
   a compensation discriminator determining whether the input analog image signal is in the normal mode or in the trick mode utilizing the comparison result and outputting the analog mode signal.

7. An apparatus of claim 6, further comprising a register storing the predetermined range.

8. An apparatus of claim 5, wherein the compensation signal is active when the NTSC mode signal indicates that the input analog image signal is in the normal mode.

9. An apparatus of claim 1, wherein the compensation signal compensates the vsync signal by resetting the vsync signal at the falling edge of the analog vsync signal.

10. A method for generating sync signal for a video signal processor, comprising the steps of:
    determining the frame rate of an input image signal;
    determining whether an image to be displayed is a digital image or an analog image, and generating a display mode signal;
    generating a clock signal according to the display mode signal and the frame rate signal;
    generating a sync compensation signal based upon the display mode signal, the clock signal and an NTSC sync signal, and
    compensating a sync signal according to the sync compensation signal and outputting a compensated sync signal.

11. A method of claim 10, wherein the step of generating the clock signal further comprises the steps of:

performing an OR logic operation with respect to the frame rate signal and the display mode signal; and selectively outputting a clock signal corresponding to the output of the OR gate.

12. A method of claim 10, wherein the step of generating the sync compensation signal further comprises the steps of:

inverting a vsync signal of an input analog image signal;

delaying an output of the vsync signal of the analog image signal by one clock;

performing a NAND logic operation with respect to the inverted vsync signal and the delayed vsync signal;

inverting the display mode signal; and performing an OR logic operation with respect to the outputs of the NAND gate operation and the inverted display mode signal, said OR gate outputting a sync compensation signal to a sync signal generator.

13. A method of claim 10, wherein the step of generating the sync compensation signal further comprises the steps of:

inverting a vsync signal of an input analog image signal;

delaying an output of the vsync signal of the analog image signal by one clock;

performing a NAND logic operation with respect to the inverted vsync signal and the delayed vsync signal;

inverting the display mode signal;

determination unit determining whether an input analog image signal is in the normal mode or in the trick mode, and outputting a analog mode signal; and performing an OR logic operation with respect to the outputs of the NAND gate operation, the inverted display mode signal, and analog mode signal, said OR gate outputting a sync compensation signal a sync signal generator.

14. A method of claim 13, wherein the step of determining and outputting the analog mode signal further comprises the steps of:

counting the number of horizontal sync signals in a vertical sync signal of the input analog image signal and outputting a count value;

comparing the count value to a predetermined range corresponding to the normal mode of the input analog image signal and outputting a comparison result; and determining whether the input analog image signal is in the normal mode or in the trick mode utilizing the comparison result and outputting the analog mode signal.

15. A method of claim 14, wherein the step of counting the number of horizontal sync signals further comprises the steps of:

inserting a hpulse at each falling edge of a horizontal sync signal;

inserting a vpulse at each falling edge of a vertical sync signal;

increasing the count value for each hpulse received; and resetting the count value to zero when the vpulse is received.

16. A method of claim 13, wherein in the step of outputting a sync compensation signal, if the sync compensation is active, the analog mode signal indicates that the input analog image signal is in the normal mode.

17. A video signal processor, comprising:

a video decoder decoding the input compressed digital image signal and outputting a digital image signal;

an analog processor processing the input analog signal and outputting an analog vsync signal and an analog hsync signal;

an image processor processing to display either the digital input image signal or the analog the input image signal according to a clock signal;

a frame detector determining the frame rate of an input image signal;

a display mode detector determining whether an image to be displayed is a digital image or an analog image, and generating a display mode signal;

a clock generator generating the clock signal according to the display mode signal and the frame rate signal;

a sync signal compensation unit generating a sync compensation signal based upon the display mode signal, the clock signal, and an NTSC sync signal, and a sync signal generator compensating a sync signal according to the sync compensation signal and outputting a compensated sync signal.

18. An apparatus of claim 17, wherein the clock generator comprises:

an OR gate performing an OR logic operation with respect to the frame rate signal and the display mode signal; and a clock selector selectively outputting a clock signal corresponding to the output of the OR gate.

19. An apparatus of claim 18, wherein the sync signal compensation unit comprises:

a first inverter inverting a vsync signal of an input analog image signal;

a delay unit delaying an output of the vsync signal of the analog image signal by one clock;

a NAND gate performing a NAND logic operation with respect to the outputs of the first inverter and the delay unit;

a second inverter inverting the display mode signal; and an OR gate performing an OR logic operation with respect to the outputs of the NAND gate and the second inverter, said OR gate outputting a sync compensation signal to said sync signal generator.

20. An apparatus of claim 18, wherein the sync signal compensation unit comprises:

a first inverter inverting a vsync signal of an input analog image signal;

a delay unit delaying an output of the vsync signal of the analog image signal by one clock;

a NAND gate performing a NAND logic operation with respect to the outputs of the first inverter and the delay unit;

a second inverter inverting the display mode signal;

a sync compensation determination unit determining whether an input analog image signal is in the normal mode or in the trick mode, and outputting a analog mode signal; and an OR gate performing an OR logic operation with respect to the outputs of the NAND gate, the second inverter, and the sync compensation determination unit, said OR gate outputting a sync compensation signal to said sync signal generator.

* * * * *